A
United States Patent [19]

Murphy et al.

[11] Patent Number: 4,532,021

[45] Date of Patent: Jul. 30, 1985

[54] ADHERENT ULTRAVIOLET CURED COATINGS

[75] Inventors: Edward J. Murphy, Mt. Prospect; Ronald J. Lewarchik, Arlington Hgts., both of Ill.; Jeffrey W. Thompson, Centerville, Ohio

[73] Assignee: DeSoto, Inc., Des Plaines, Ill.

[21] Appl. No.: 606,527

[22] Filed: May 7, 1984

Related U.S. Application Data

[63] Continuation-in-part of Ser. No. 515,027, Jul. 18, 1983, abandoned.

[51] Int. Cl.$^3$ .................... C08J 3/28; C08L 31/08; C08L 31/10; C08L 31/12
[52] U.S. Cl. .................... 204/159.16; 204/159.23; 525/293; 525/296
[58] Field of Search .................... 204/159.16, 159.23

[56] References Cited

U.S. PATENT DOCUMENTS

| 4,144,157 | 3/1979 | Guse et al. | 204/159.23 |
| 4,147,604 | 4/1979 | Kuesters et al. | 204/159.23 |
| 4,176,028 | 11/1979 | Graham | 204/159.16 |
| 4,198,241 | 4/1980 | Bronstert et al. | 204/159.23 |
| 4,199,420 | 4/1980 | Photis | 204/159.23 |
| 4,277,319 | 7/1981 | Nyi et al. | 204/159.23 |
| 4,454,219 | 6/1984 | Yamadera et al. | 204/159.16 |

*Primary Examiner*—Allan M. Lieberman
*Attorney, Agent, or Firm*—Dressler, Goldsmith, Shore, Sutker & Milnamow, Ltd.

[57] ABSTRACT

Ultraviolet-curable liquid coating compositions are disclosed in which improved adhesion to metal and plastic surfaces is obtained. This improvement is obtained by using, in admixture: (1) from 10% to about 60% of total resin solids of an organic solvent-soluble solution copolymer of monoethylenically unsaturated monomers including from 2.5% to 10% of tertiary amine monomer which is an aminoalkyl ester or amide of an alpha, beta-monoethylenic monocarboxylic acid in which the alkyl group contains 2–4 carbon atoms; and (2) from 40% to 90% of total resin solids of radiation-curable ethylenically unsaturated liquid. The coating composition includes photoinitiators and/or photosensitizers rendering the composition sensitive to ultraviolet light, and the components are present in solution in at least about 10% of inert volatile organic solvent.

15 Claims, No Drawings

ADHERENT ULTRAVIOLET CURED COATINGS

DESCRIPTION

This application is a continuation-in-part of our prior application Ser. No. 515,027 filed July 18, 1983, now abandoned.

TECHNICAL FIELD

This invention relates to ultraviolet-curable liquid coating compositions exhibiting improved adhesion to various substrates, especially to metal and plastic surfaces. The coating of metal surfaces which have been deposited on various surfaces by vacuum metallization (usually chromium deposited by vacuum sputtering) is particularly contemplated.

BACKGROUND ART

Coatings which cure rapidly on exposure to ultraviolet light are well known, but these are usually poorly adherent to metal and plastic surfaces. Chromium surfaces are particularly difficult to adhere to. The vacuum deposited chromium surfaces require overcoating to protect them, and this is now done with thermally cured coatings. The purpose is to protect the metal surface from abrasion and moisture, as is encountered on exterior exposure. This is now carried out using a two-package system in which an hydroxy functional polymer and an organic polyisocyanate are mixed and applied and then reacted at moderate temperature to form a polyurethane coating. Adhesion to the chromium surface is less than satisfactory than desired, and the cure is slow.

This invention is directed to providing liquid ultraviolet-curable coating compositions which will cure rapidly to form a strongly adherent coating on metal and plastic surfaces, including vacuum deposited chromium, and which will protect these surfaces against abrasion, moisture and organic solvents.

DISCLOSURE OF INVENTION

In accordance with this invention, it has been found that organic solvent solution copolymers of monoethylenically unsaturated monomers including a critical proportion of a tertiary amine monomer, preferably an aminoalkyl ester or amide of an alpha, beta-monoethylenic monocarboxylic acid, especially acrylic or methacrylic acid, may be used in admixture with radiation-curable ethylenically unsaturated liquids, it being preferred that at least a portion of said unsaturated liquids are polyethylenically unsaturated. Appropriate photoinitiators and/or photosensitizers should be present to render the composition sensitive to ultraviolet light. These are placed in a liquid medium having coating viscosity through the presence of at least about 10%, preferably from 25% to 50% of inert organic solvent, which is preferably alcoholic in character to enable thermoplastic surfaces to withstand its presence. The result is liquid coating compositions which cure to form good films when applied as a coating and cured by exposure to ultraviolet light, and which are strongly adherent to the metal or plastic substrate to which they are applied.

The solution copolymer will constitute from 10% to about 60% of the resin solids content of the coating composition. Since the copolymer importantly contributes to the character of the resulting cured film and its adhesion to the substrate, it is preferred to maximize its proportion, and for this reason it is desired to have the solution copolymer present in an amount of from 40% to about 60%. Indeed, it is desired to come as close to the maximum proportion as possible. Above about 60%, the film properties fall off rapidly because there is too little radiation-curable ethylenically unsaturated material present in the film, and since the exact maximum proportion of copolymer solids will vary somewhat with the selection and proportioning of monomers in the copolymer, the upper limit cannot be specified more exactly.

The solution copolymer will consist essentially of copolymerized monoethylenically unsaturated monomers, and these will preferably include a major proportion of acrylic or methacrylic acid esters. It is important that this copolymer contain from 2.5% to 10% of the tertiary amine monomer.

All proportions herein are by weight, unless otherwise stated, and they are important because, unless the tertiary amine proportion in the copolymer is within the narrow limits stated, the properties of the cured coatings obtained on ultraviolet exposure are not satisfactory. With too little amine content in the copolymer, the ultraviolet cure is not satisfactory, and the adhesion, mechanical resistance and moisture resistance fall off for this reason. When more than 10% of the amine monomer is present in the copolymer, there are too many polymerization sites, and the properties of the cured coatings are again inadequate.

In many instances it is also necessary to have an approximately equal weight proportion of copolymer and ethylenically unsaturated liquid, and this explains the preferred proportions which have been set forth. In some instances, a smaller proportion of the copolymer will produce a useful result, and this is why the broad range of proportions may contain as little as 10 parts of copolymer to 90 parts of ethylenic liquid, though the preferred weight weight ratio is 40:60 to 60:40.

The preferred ethylenically unsaturated liquids are polyacrylates, though other ethylenic unsaturation which will respond to ultraviolet radiation in the presence of appropriate photoinitiators or photosensitizers may be used, such as methacrylate unsaturation. The acrylates respond better to ultraviolet light, and thus are preferred. Hydroxyl functional polyacrylates are particularly preferred. Trimethylol propane diacrylate and triacrylate and pentaerythritol triacrylate and tetraacrylate are all useful, the hydroxy functional illustrations being preferred. The useful methacrylates would be those corresponding to the above acrylates. Diacrylates are also useful, as illustrated by 1,6-hexane diol diacrylate and neopentyl glycol diacrylate.

Other liquid polyacrylates are provided by reacting hydroxy acrylates, like 2-hydroxyethyl acrylate, with isocyanate functional monomers and oligomers, like isophorone diisocyanate and the oligomer formed by reacting a stoichiometric excess of isophorone diisocyanate with a polypropylene glycol of molecular weight 400.

The term "acrylate" and "polyacrylate" as used herein denotes acrylic acid ester groups, and this is an accepted use of this language.

While polyethylenically unsaturated liquids are preferred, one can use these alone or together with radiation-curable monoethylenically unsaturated liquids, like ethylhexyl acrylate, butyl acrylate, methyl acrylate N-vinyl pyrrolidone, and the like.

The copolymers which are used herein should be solution copolymers to provide the solubility desired to adequately distribute the copolymer into the liquid portion of the coating composition. Solution copolymerization is itself well known and indicates that the monomers and the polymers are soluble in the organic solvent in which the polymerization is carried out.

It is preferred that at least 40% of the copolymer be copolymerized methyl methacrylate because this provides films having good physical properties, but this is not essential, and styrene, vinyl toluene, methyl acrylate, vinylidene chloride, and other monomers which form polymers of good physical character are also useful. The balance of the copolymer, except for the amine monomer, is desirably constituted by monomers having no reactive group other than the single ethylenic group, and it is preferred to include at least 15% of $C_2$–$C_{12}$ alkyl ester of acrylic or methacrylic acid, such as butyl acrylate, 2-ethylhexyl acrylate and isobutyl methacrylate. Styrene, vinyl toluene and vinyl acetate will further illustrate the monomers which may be present, especially in minor amount.

All sorts of tertiary amine monomers which may be copolymerized in organic solvent solution may be used, but it is preferred to employ tertiary amines which are aminoalkyl esters or amides of acrylic or methacrylic acid having 2–4 carbon atoms in the alkyl group. These are illustrated by dimethyl aminoethyl methacrylate or acrylate or methacrylamide or acrylamide. The corresponding aminopropyl and aminobutyl monomers are also useful.

To insure the desired solvation of the copolymer into the liquid portion of the coating composition, an inert volatile organic solvent is present. If the copolymer is of low molecular weight, one can employ as little as about 10% of solvent, but it is preferred to have at least 25% thereof, especially when the solvent is mostly alcoholic to avoid attacking thermoplastic substrates. However, it will be appreciated that the coating of metal substrates is also contemplated, and there the character of the solvent is not important since it cannot attack the metal. Of course, one would still wish to avoid costly or hazardous solvents, but these are secondary considerations. Substrates which are sensitive to heat and/or strong solvents are illustrated by ABS (a polymer of acrylonitrile, butadiene and styrene), polycarbonate resin, polystyrene, and the like. In order that the solvent will have little capacity to dissolve thermoplastic substrates, it is preferred to have present at least about 30% of the solvent medium of a $C_1$ to $C_4$ alkanol, like ethanol or butanol, but especially isopropanol. Any balance of the solvent medium having minimum capacity to attack thermoplastic substrates can include butyl acetate, desirably in admixture with a small proportion of a ketone, such as acetone or methyl amyl ketone. It is especially preferred to use from 25% to 50% of solvent based on the solution.

When monoethylenically unsaturated materials are present in admixture with polyethylenically unsaturated materials, it is preferred to employ these in an amount of from 3% to 30% of total resin solids, more preferably from 5% to 20%. The preferred monoethylenically unsaturated materials are triallyl cyanurate, vinyl pyrrolidone and dimethyl acrylamide.

Conventional photosensitizers and/or photoinitiators are added to the liquid coating compositions of this invention, which are preferably solvent solutions as has been indicated. These additions render the unsaturated liquid mixture sensitive to ultraviolet light, as is itself well known and as is illustrated in the Examples. These Examples will also illustrate the addition of auxiliary agents which may be added for known purpose.

The solvent solution coating compositions of this invention are normally applied in any desired fashion to provide a film having a thickness adequate to provide a dry film having a thickness of from 0.25 to 3 mils, but preferably about 1 mil. The wet film is then allowed to thicken by vaporization of volatiles which is usually carried out at room temperature over a period of from 5 to 10 minutes. The thickened wet coating from which the bulk of the solvents has been removed by vaporization is then exposed to ultraviolet light to rapidly cure the coating. Using a flux density of 0.02 Watts/cm$^2$ at 270 nanometers as illustrative, it is found that a good cure is obtained in about 20 seconds for typical coating compositions.

The invention is illustrated in the following Examples which show preferred operation of this invention.

ACRYLIC POLYMER #1

60 parts of methyl methacrylate, 30 parts of 2-ethylhexyl acrylate and 10 parts of dimethylaminoethyl methacrylate are polymerized in a 55% solution in a 2/1 solvent blend of isopropanol/butyl acetate to provide a 55% copolymer solution.

ACRYLIC POLYMER #2

60 parts of methyl methacrylate, 35 parts of 2-ethylhexyl acrylate and 5 parts of dimethylaminoethyl methacrylate are polymerized in a 55% solution in a 2/1 solvent blend of isopropanol/butyl acetate to provide a 55% copolymer solution.

ACRYLIC POLYMER #3

60 parts of methyl methacrylate, 35 parts of 2-ethylhexyl acrylate and 5 parts of dimethylaminopropyl methacrylamide are polymerized in a 55% solution in a 2/1 solvent blend of isopropanol/butyl acetate to provide a 55% copolymer solution.

ACRYLIC POLYMER #4

60 parts of methyl methacrylate, 32 parts of 2-ethylhexyl acrylate and 8 parts of dimethylaminopropyl methacrylamide are polymerized in a 55% solution in a 2/1 solvent blend of isopropanol/butyl acetate to provide a 55% copolymer solution.

Other coating components:

| Component | Supplier | Identification |
| --- | --- | --- |
| N—vinyl pyrrolidone | GAF | NVP |
| Trimethylolpropane triacrylate | Celanese | TMPTA |
| Pentaerythritol triacrylate | Ware | PETA |
| Urethane triacrylate oligomer | Thiokol | Uvithane 788 |
| Urethane triacrylate oligomer | Polychrome | Uvimer 530 |
| Triallyl cyanurate | American Cyanamid | TAC |
| Benzophenone | Aldritch | — |
| Diethoxy acetophenone | Union Carbide | DEAP |
| Dimethoxyphenyl acetophenone | Ciba-Geigy | Irgacure 651 |

The above abbreviations are used in the Table which follows:

TABLE

Ultraviolet Cure Topcoat Formulations:

Parts by Weight

| Component | A | B | C | D | E | F |
|---|---|---|---|---|---|---|
| Acrylic #1 sol'n | | | | 44 | | |
| Acrylic #2 sol'n | 44 | | | | 36 | |
| Acrylic #3 sol'n | | 36 | | | | |
| Acrylic #4 sol'n | | | 36 | | | 36 |
| TMPTA | 10 | | | | | |
| PETA | | 8 | 8 | 12 | 8 | 8 |
| Uvimer 530 | | 8 | | | 8 | 8 |
| Uvithane 788 | | | 8 | | | |
| NVP | 15 | 4 | 4 | 4 | | |
| TAC | | | | | 4 | 4 |
| Benzophenone | 2.4 | 1.6 | 1.6 | 1.6 | 1.6 | 1.6 |
| DEAP | | | | 1.6 | | |
| Irgacure 651 | | 1.6 | 1.6 | | | |
| Butyl Acetate | 20 | 29 | 29 | 25.7 | 29 | 29 |
| Isopropanol | 6 | 8 | 8 | 7.4 | 8 | 8 |
| Methyl ethyl ketone | 3 | 4 | 4 | 3.7 | 4 | 4 |

The coating components are blended under mild agitation to provide homogeneous coating solutions of approximately 40% solids by weight and viscosity about 20 seconds with a #2 Zahn cup. It may be desired to make further additions of various surface active agents to aid in flow out and/or prevension of surface defects, as is well known. It may further be desired to add small quantities of commercially known and available agents to enhance the cured film exterior durability, such as a hindered amine ultraviolet absorber from Ciba-Geigy under the trade name Tinuvin 292.

APPLICATION

The coating compositions described in the Table are sprayed on a chromium vapor deposit on a thermoplastic molding in a layer which, after curing, is one mil thick. The wet coatings are allowed to dry in air for about 7 minutes to remove volatiles, and the thickened coatings so-provided are subjected to ultraviolet light having a wavelength of 270 nanometers with a flux density of 0.02 Watts/cm$^2$ for 20 seconds to cure the same. The cured coatings are abrasion resistant and strongly adherent to the chromium surface. The coating serves to protect the chromium surface from the degradative influences of exterior exposure. The final products are normally used in automobiles, so the need for exterior durability and abrasion resistance will be manifest.

These same coating compositions were also applied in a thickness of 0.8-1.0 mil on bare aluminum and cured under the same ultraviolet light for 30 seconds. The cured coatings were slit to bare metal in a cross-hatched pattern and covered with Scotch brand pressure-sensitive tape. When the tape was peeled off, the cross-hatched areas were inspected to determine how much of the coating was removed with the tape. It was found that hardly any coating was removed, so these compositions were rated 9-10 on a scale of 0-10 in which 0 indicates complete removal of coating, and 10 indicates that none of the coating was removed. An effort was then made to repeat some of this work using corresponding copolymer solutions in which the tertiary amine monomer component was omitted. To substitute for the tertiary amine-containing copolymer, Uvimer 530 oligomer was Michael adducted with a stoichiometric proportion of dibutyl amine to produce a saturated oligomer containing tertiary amine groups. This oligomeric tertiary amine was then used in an amount to provide the same amount of tertiary amine groups in the coating composition. These modified compositions still cured well when subjected to the same ultraviolet radiation, but the cured films rated 0-1 on the described adhesion test (almost all of the coating was removed from the aluminum substrate with the adhesive tape).

While the coating of vacuum deposited metal surfaces is an important utility for this invention, and has been illustrated, many other coating purposes can be served. When vacuum deposited metal is to be overcoated, the coatings will normally be transparent. The compositions of sthis invention are also effective to seal the surface porosities in fiber-reinforced plastics, especially glass fiber-reinforced polyester resin substrates, in which case the coating may be pigmented, but is preferably also transparent. The coating compositions of these examples may be applied and cured for various purposes in the same way illustrated herein.

While the most significant uses now known have been noted, other similar utilities will be evident to those skilled in the art, and the improved adhesion to metal and plastic surfaces is consitently beneficial.

What is claimed is:

1. An ultraviolet-curable liquid coating composition exhibiting improved adhesion to metal and plastic surfaces comprising, in admixture: (1) from 10% to about 60% of total resin solids of an organic solvent-soluble solution copolymer of monoethylenically unsaturated monomers including from 2.5% to 10% of tertiary amine monomer which is an aminoalkyl ester or amide of an alpha,beta-monethylenic monocarboxylic acid in which the alkyl group contains 2-4 carbon atoms, the balance of the copolymer, except for the amine monomer, being constituted by monomers having no reactive group other than the single ethylenic group, at least 40% of said copolymer being copolymerized methyl methacrylate and at least 15% of the copolymer being copolymerized $C_2$–$C_{12}$ alkyl ester of acrylic or methacrylic acid; and (2) from 40% to 90% of total resin solids of radiation-curable ethylenically unsaturated liquid, said coating composition including photoinitiators and/or photosensitizers rendering the composition sensitive to ultraviolet light, and said components being present in solution in at least about 25% of inert volatile organic solvent in which the solvent content of said solution contains at least 30% of a $C_1$–$C_4$ alkanol.

2. A coating composition as recited in claim 1 in which the solvent content of said solution contains said alkanol in admixture with butyl acetate and a ketone.

3. A coating composition as recited in claim 2 in which said alkanol is isopropanol.

4. A coating composition as recited in claim 1 in which said ethylenically unsaturated liquid comprises liquid polyacrylate.

5. A coating composition as recited in claim 5 in which said liquid polyacrylate is hydroxy-functional.

6. A coating composition as recited in claim 4 in which said liquid polyacrylate is trimethylol propane diacrylate.

7. A coating composition as recited in claim 4 in which said liquid polyacrylate is pentaerythritol triacrylate.

8. A coating composition as recited in claim 1 in which said monocarboxylic acid is acrylic acid.

9. A coating composition as recited in claim 8 in which said tertiary amine monomer is dimethyl substituted.

10. A coating composition as recited in claim 8 in which said components (1) and (2) are present in a weight ratio of 40:60 to 60:40.

11. A coating composition as recited in claim 4 in which said coating composition includes from 3% to 30% of resin solids of monoethylenically unsaturated liquid selected from the group consisting of triallyl cyanurate, N-vinyl pyrrolidone and dimethyl acrylamide.

12. A coating composition as recited in claim 11 in which from 5% to 20% of said monoethylenically unsaturated liquid is present.

13. A coating composition as recited in claim 12 in which said monoethylenically unsaturated liquid is N-vinyl pyrrolidone.

14. A coating composition as recited in claim 11 in which said composition is rendered sensitive to ultraviolet light using a mixture of benzophenone and diethoxyacetophenone.

15. An ultraviolet-curable liquid coating composition exhibiting improved adhesion to metal and plastic surfaces comprising, in admixture: (1) from 40% to about 60% of total resin solids of an organic solvent-soluble solution copolymer of monoethylenically unsaturated monomers including from 2.5% to 10% of tertiary amine monomer which is an aminoalkyl ester or amide of acrylic acid in which the alkyl group contains 2–4 carbon atoms, the balance of the copolymer, except for the amine monomer, being constituted by monomers having no reactive group other than the single ethylenic group, at least 40% of said copolymer being copolymerized methyl methacrylate and at least 15% of the copolymer being copolymerized $C_2$–$C_{12}$ alkyl ester of acrylic or methacrylic acid; and (2) from 40% to 60% of total resin solids of radiation-curable ethylenically unsaturated liquid comprising hydroxy-functional polyacrylate liquid, said coating composition including photoinitiators and/or photosensitizers rendering the composition sensitive to ultraviolet light, and said components being present in solution in from 25% to 50% of inert volatile organic solvent comprising at least 30% of isopropanol in admixture with butyl acetate.

\* \* \* \* \*

UNITED STATES PATENT AND TRADEMARK OFFICE
CERTIFICATE OF CORRECTION

PATENT NO. : 4,532,021
DATED : July 30, 1985
INVENTOR(S) : Edward J. Murphy et al.

It is certified that error appears in the above-identified patent and that said Letters Patent is hereby corrected as shown below:

Column 6, line 56 (first line of claim 5), change the claim dependency from "5" to: --4--.

Signed and Sealed this

Eighth Day of October 1985

[SEAL]

Attest:

DONALD J. QUIGG

Attesting Officer

Commissioner of Patents and
Trademarks—Designate